United States Patent

Nakamura et al.

(10) Patent No.: US 7,616,532 B2
(45) Date of Patent: Nov. 10, 2009

(54) OPTICAL DISC DRIVE

(75) Inventors: Shigeo Nakamura, Odawara (JP);
Takeshi Shimano, Yokohama (JP);
Masaya Horino, Ishioka (JP); Irizo Naniwa, Odawara (JP); No-Cheol Park, Seoul (KR); Jeonghoon Yoo, Seoul (KR); Dong-Ju Lee, Seoul (KR); Jeseung Oh, Seoul (KR); Chul Park, Seoul (KR)

(73) Assignee: Hitachi, Ltd., Tokyo (JP)

( * ) Notice: Subject to any disclaimer, the term of this patent is extended or adjusted under 35 U.S.C. 154(b) by 575 days.

(21) Appl. No.: 11/529,346

(22) Filed: Sep. 29, 2006

(65) Prior Publication Data

US 2007/0121436 A1    May 31, 2007

(30) Foreign Application Priority Data

Nov. 25, 2005   (JP) .............................. 2005-339589

(51) Int. Cl.
*G11B 7/00* (2006.01)
(52) U.S. Cl. .................................... 369/44.19; 720/662
(58) Field of Classification Search .............. 369/44.19; 360/266.8; 720/662
See application file for complete search history.

(56) References Cited

U.S. PATENT DOCUMENTS

| | | | | |
|---|---|---|---|---|
| 5,165,090 A | * | 11/1992 | Takahashi et al. ........... | 720/662 |
| 5,465,242 A | * | 11/1995 | Terashima et al. ......... | 369/44.19 |
| 6,704,256 B2 | * | 3/2004 | Berg et al. ................ | 369/44.19 |
| 7,079,455 B2 | * | 7/2006 | Cheong et al. ............ | 369/44.19 |
| 7,480,215 B2 | * | 1/2009 | Makela et al. ............. | 369/44.19 |
| 2002/0057631 A1 | * | 5/2002 | Raymond et al. ......... | 369/44.19 |
| 2005/0094505 A1 | * | 5/2005 | Kanazawa ................ | 369/44.19 |
| 2006/0123437 A1 | * | 6/2006 | Lee et al. ..................... | 720/662 |

FOREIGN PATENT DOCUMENTS

| | | |
|---|---|---|
| JP | 2003-500787 | 1/2003 |
| WO | WO 00/72312 | 11/2000 |

OTHER PUBLICATIONS

ASME/JSME Joint Conference on Micromechatronics for Information and Precision Equipment (MIPE) Santa Clara, CA Jun. 21-23, 2006.

* cited by examiner

*Primary Examiner*—Peter Vincent Agustin
(74) *Attorney, Agent, or Firm*—Antonelli, Terry, Stout & Kraus, LLP.

(57) ABSTRACT

A small-sized optical disc drive includes one voice coil motor magnet within which a tracking coil and two focusing coils are disposed such that the tracking coil straddles the two poles of permanent magnets that are adjacently disposed. The two focusing coils are disposed on either side of the tracking coil, with each of the two focusing coils being only disposed over one of the permanent magnets.

7 Claims, 10 Drawing Sheets

OPTICAL DISC DRIVE

BACKGROUND OF THE INVENTION

1. Field of the Invention

The invention relates to an optical disc drive and particularly to a swing arm-type head positioning actuator for optical disc drives.

2. Background Art

An example of the aforementioned type of actuator is disclosed in JP Patent Publication (Kohyo) No. 2003-500787 A.

Actuators for hard disk drives and optical disc drives, which employ rotational disk (disc) information recording media, include linear actuators by which a recording/reproducing head or a reproducing head is moved linearly, and swing arm (also referred to as "rotary") actuators by which such head is moved in a swinging manner. When it is desired that the drives be reduced in size, a swing arm actuator is employed. In optical disc drives, the actuator performs a focusing operation for maintaining a constant distance between the head and the disc surface, in addition to the operation to position the head at a desired position along the radius of the disk, or a tracking operation. In smaller optical disc drives, as described in JP Patent Publication (Kohyo) No. 2003-500787 A, the entire arm is tilted relative to the disc (e.g., vertically when the disk is horizontally disposed) so as to maintain a constant distance between the head and the disc surface.

Patent Document 1: JP Patent Publication (Kohyo) No. 2003-500787 A

SUMMARY OF THE INVENTION

However, the actuator disclosed in JP Patent Publication (Kohyo) No. 2003-500787 A requires two sets of magnet assemblies, a tracking magnet assembly and a focusing magnet assembly, thus requiring a large space for the mounting thereof. Further, because the two sets of magnet assemblies are used, the number of components is greater than that of an actuator for a hard disk drive or an optical disc drive employing a flying head.

It is therefore an object of the invention to provide an actuator that requires a small space for the mounting of magnet assemblies and a small-sized optical disc drive employing such actuator.

The present invention provides an actuator that includes a tracking coil disposed between two focusing coils, and a pair of permanent magnets horizontally disposed opposite these coils. The tracking coil is disposed over the both permanent magnets in such a manner as to straddle the boundary thereof. One of the two focusing coils is disposed over one of the pair of permanent magnets, and the other of the two focusing coils is disposed over the other of the pair of permanent magnets.

In accordance with the invention, an actuator for optical disc drives can be realized in which a focusing operation and a tracking operation can be performed with a pair of permanent magnets. Thus, an actuator for optical disc drives that offers high spacing efficiency and that is inexpensive can be realized. Further, the use of such actuator makes it possible to realize an optical disc drive that is small-sized and inexpensive.

DESCRIPTION OF THE PREFERRED EMBODIMENTS OF THE INVENTION

Embodiment 1 of the invention is described with reference to the drawings.

Embodiment 1

Figure 1:
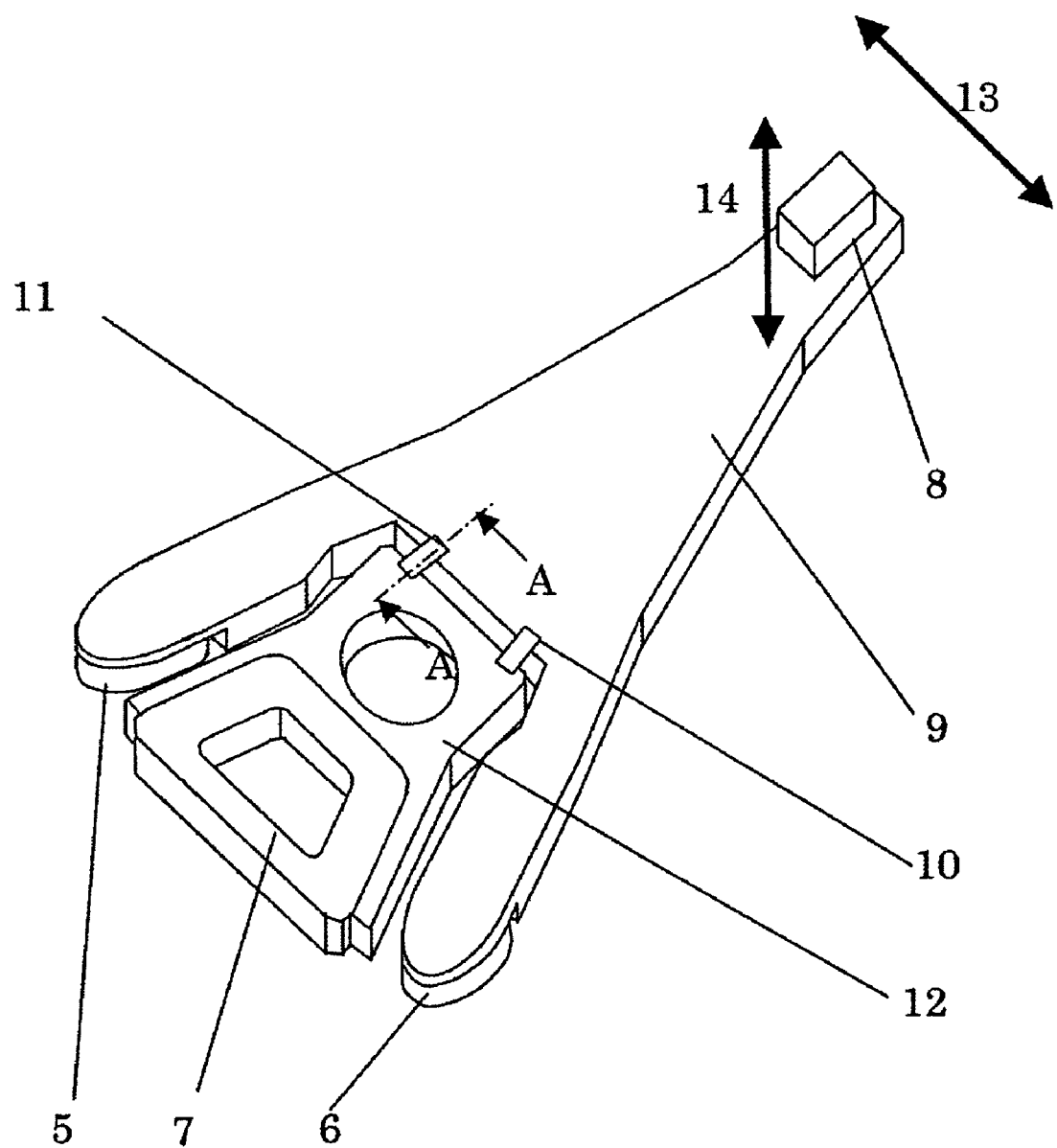
FIG. 1 shows a perspective view of an actuator moving part according to Embodiment 1 of the invention.

FIG. 1 shows a perspective view of an actuator moving part 1 according to Embodiment 1 of the invention.

An optical pickup 8 for the recording and reproduction or for the reproduction of information is joined to an arm 9.

The arm 9 carries focusing coils 5 and 6 and is connected to a part 12 via two hinges 10 and 11. The part 12 is connected to a swingable pivot bearing unit. The hinges 10 and 11 allow the arm 9 to be moved together with the part 12, which is fixed to the swingable pivot bearing unit in the tracking direction 13 of the optical pickup 8. The hinges 10 and 11 also allow the arm 9 to be moved separately from the part 12; namely, in a focusing direction 14 of the optical pickup 8. The part 12, which is fixed to the swingable pivot bearing unit, carries a tracking coil 7.

Figure 2:
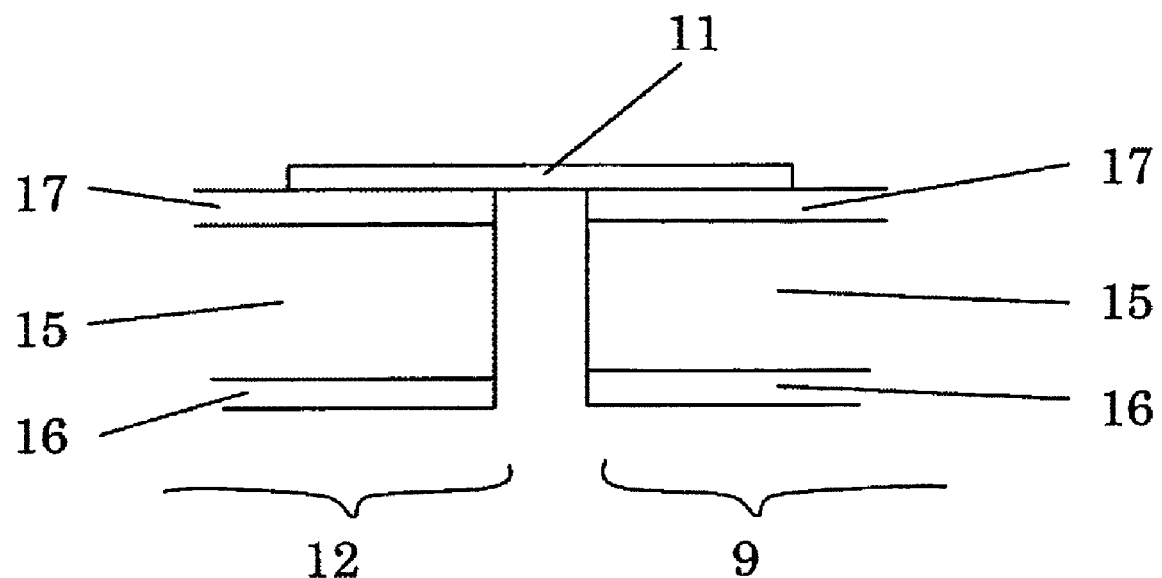
FIG. 2 shows an A-A cross section of Embodiment 1 shown in FIG. 1.

FIG. 2 shows an A-A cross section of the actuator moving part shown in FIG. 1. The arm 9 and the part 12 fixed to the swingable pivot bearing unit each have a three-layer structure consisting of an aluminum plate 15 sandwiched by stainless steel plates 16 and 17. The hinges 10 and 11 are formed of stainless steel plates and are connected, by welding, to the arm 9 and the part 12 fixed to the swingable pivot bearing unit.

Figure 6:
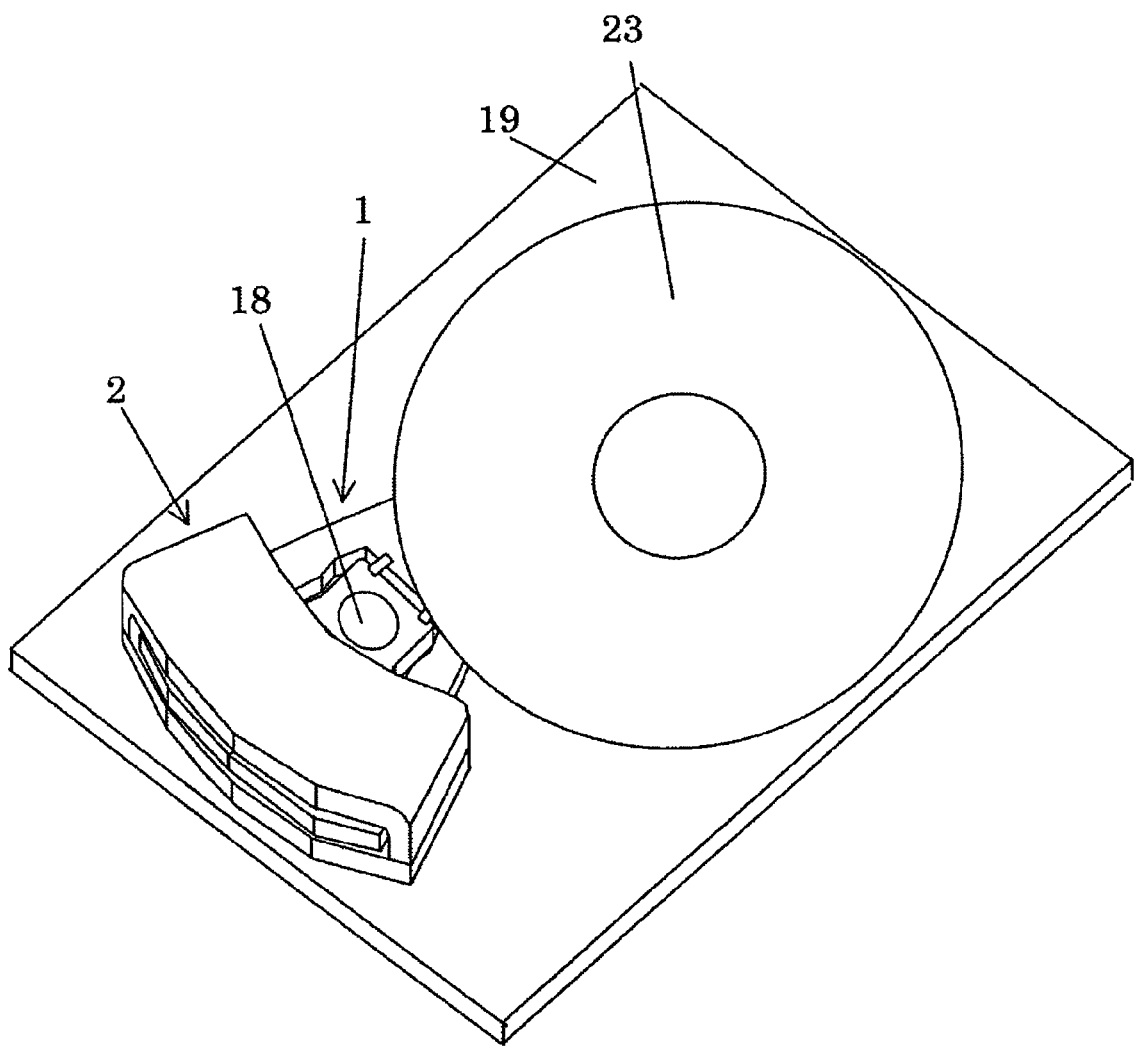
FIG. 6 shows a perspective view of an optical disc drive according to Embodiment 1 of the invention.

FIG. 6 shows a perspective view of an optical disc drive mechanism unit employing a structure comprised of the actuator moving part 1 of FIG. 2 to which a voice coil motor magnet 2 is attached. The part 12 is fixed to a pivot bearing unit 18 that is swingable in the tracking direction 13. The pivot bearing unit 18 is fixed to a base casing 19.

Figure 3:
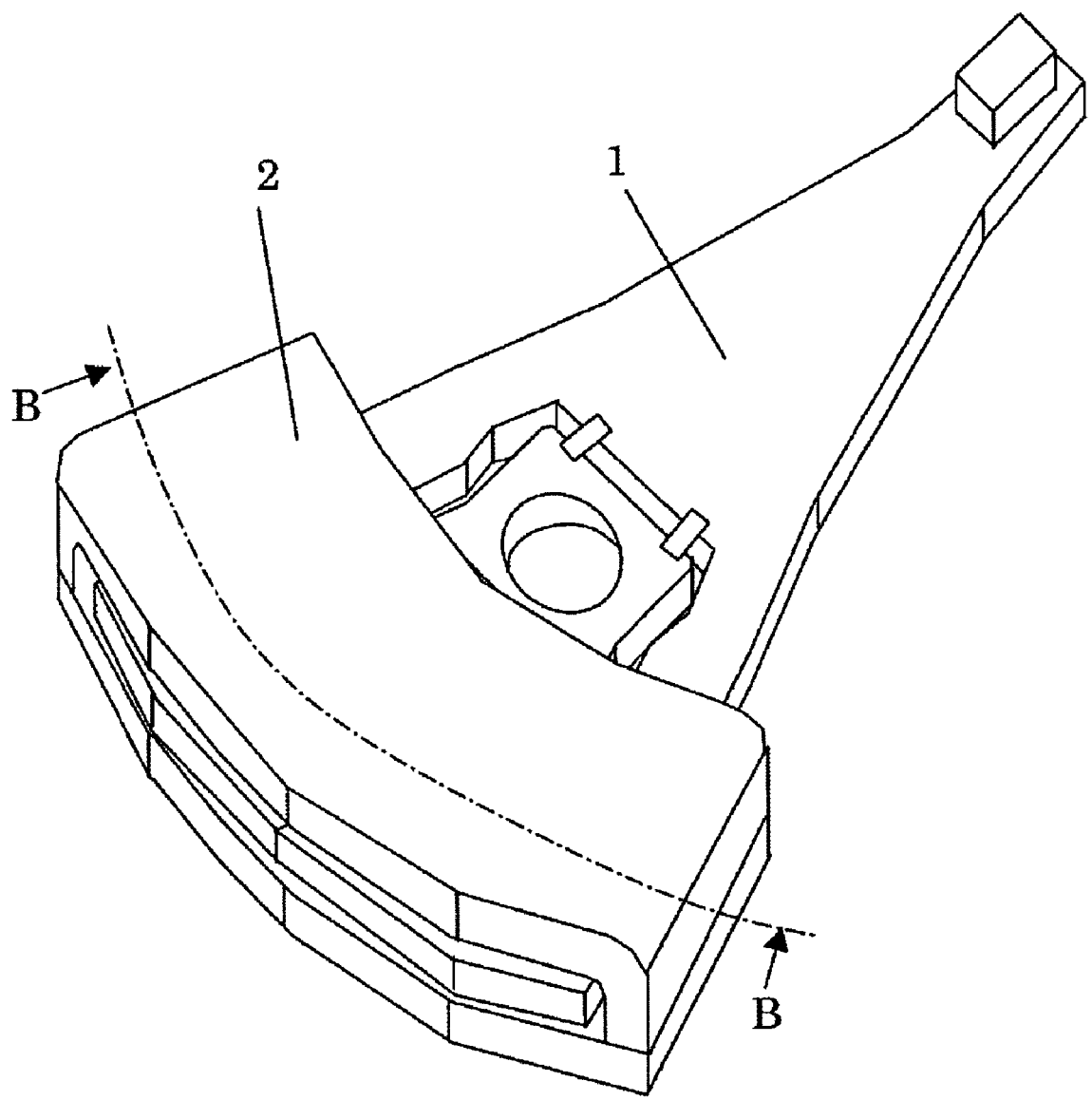
FIG. 3 shows a perspective view of a structure assembled from the actuator moving part 1 of Embodiment 1 and a magnet 2.
Figure 4:
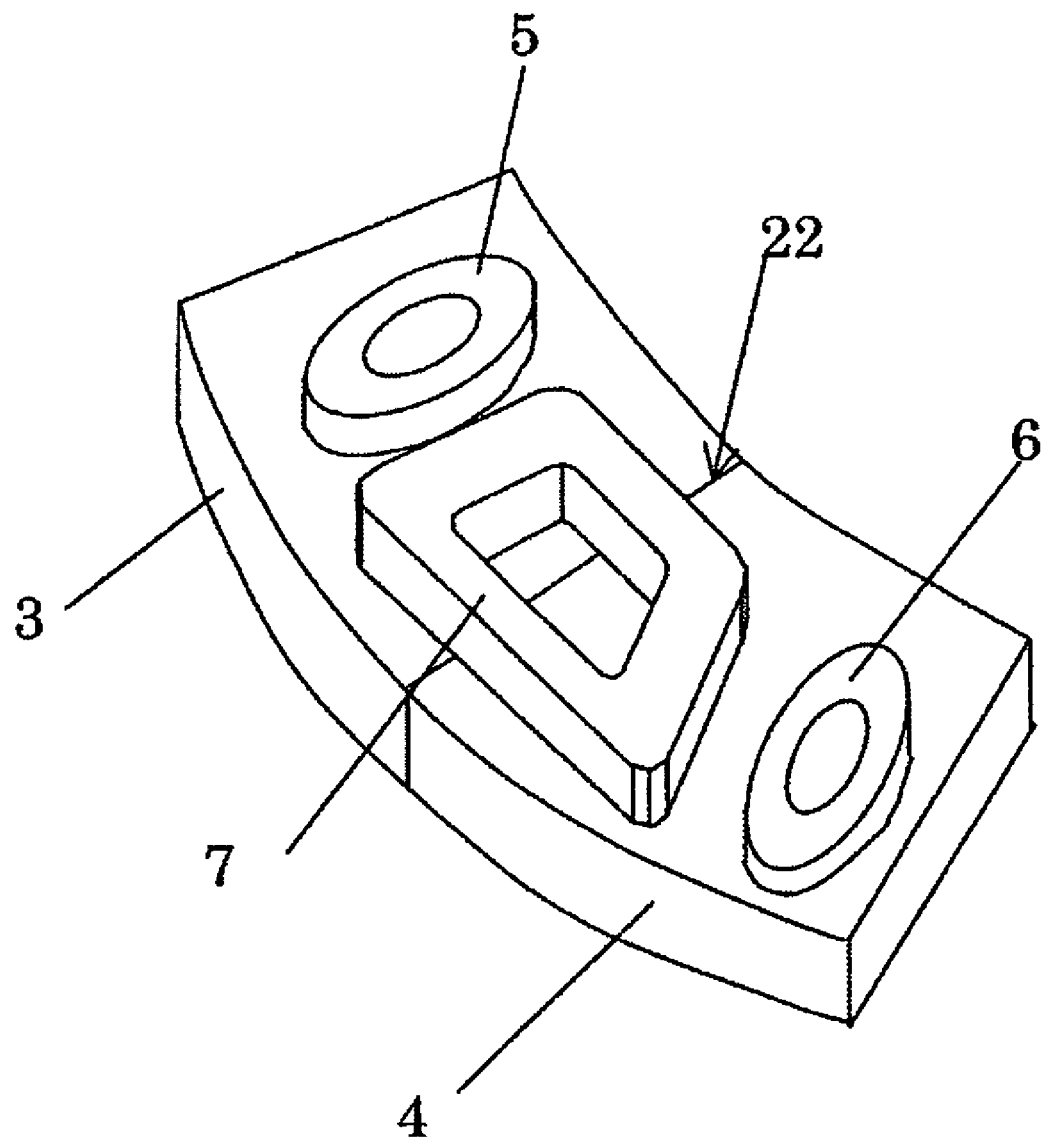
FIG. 4 schematically shows the positional relationship among the magnet 2, focusing coils 3 and a tracking coil 4 of Embodiment 1.
Figure 5:
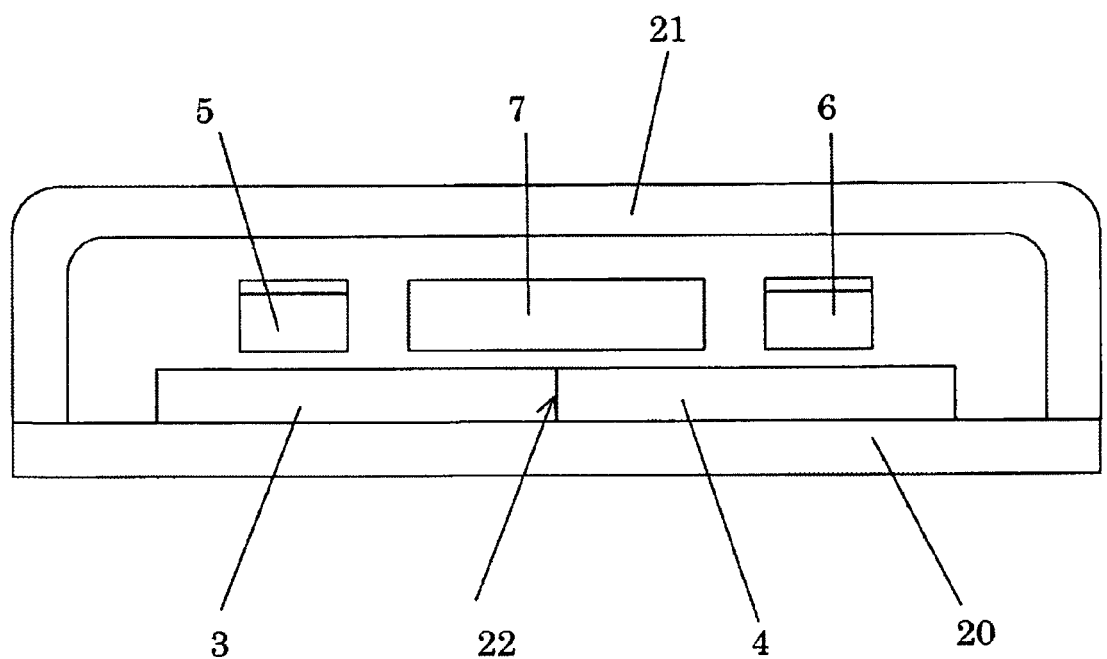
FIG. 5 shows a B-B cross section of Embodiment 1 shown in FIG. 3.

FIG. 3 shows a perspective view of the structure assembled from the actuator moving part 1 shown in FIGS. 1 and 2 and the voice coil motor magnet 2. FIG. 4 schematically shows the positional relationship among permanent magnets 3 and 4, focusing coils 5 and 6 and the tracking coil 7 of the structure shown in FIG. 3. FIG. 5 shows a B-B cross section of the structure. As shown in FIG. 5, the voice coil motor magnet 2 is composed of a pair of permanent magnets 3 and 4 and a pair of yokes 20 and 21. The permanent magnets 3 and 4 are disposed side by side and joined to the lower yoke 20. The directions of magnetization of the permanent magnets 3 and 4 are opposite to each other vertically. Namely, when the polarity of the lower surface of the permanent magnet 3 that is joined to the yoke 20 is N, the polarity of the upper surface of the permanent magnet 3 that is opposed to the yoke 21 is S. When the polarity of the upper surface of the permanent magnet 4 opposite the yoke 21 is N, the polarity of the lower surface thereof joined to the yoke 20 is S. The yoke 20 on the lower side of the voice coil motor magnet 2 is fixed to the base casing 19 shown in FIG. 6.

The tracking coil 7 and the focusing coils 5 and 6 are disposed between the permanent magnets 3 and 4 and the upper yoke 21. The tracking coil 7 is disposed straddling a polarity change line 22 of the voice coil motor magnet 2 at the boundary (joint surfaces) of the permanent magnets 3 and 4. The focusing coil 5 is disposed above one pole of the voice coil motor magnet 2; namely, above permanent magnet 3. The focusing coil 6 is disposed above the other pole of the voice coil motor magnet 2; namely, above the permanent magnet 4. The focusing coils 5 and 6 are each disposed such that neither straddles the polarity change line 22.

As a current flows through the tracking coil 7, an electromagnetic force is generated in the tracking direction 13 shown in FIG. 1, whereby the optical pickup 8 can be positioned as desired along the radius of the disc information recording medium 23.

The focusing coils 5 and 6 generates a force in the focusing direction 14 shown in FIG. 1 as a current flows therethrough. The direction of current is adjusted such that, when the focusing coils 5 and 6 are viewed from above, i.e., from one focusing direction 14, the current in each coil flows in the opposite winding direction. As the force is applied to the focusing coils 5 and 6 in the focusing direction 14, the arm 9 is tilted, with the center of rotation being located at the hinges 10 and 11, whereby the optical pickup 8 can be moved in the focusing direction 14. By controlling the current that flows through the focusing coils 5 and 6, the optical pickup 8 can be positioned on the disc 23 with a constant gap provided therebetween.

Thus, the optical pickup 8 can be positioned as desired along the radius of the disc 23 using one voice coil motor magnet 2, while a constant gap is maintained between the optical pickup 8 and the disc 23.

In the foregoing embodiment, the arm 9 and the part 12 fixed to the swingable pivot bearing unit each had a three-layer structure consisting of the aluminum plate 15 sandwiched by the stainless steel plates 16 and 17. Alternatively, they may be made of a single stainless steel plate, a single aluminum plate, engineering plastic reinforced with carbon or glass fiber, silicon, a silicon compound, or a combination thereof in a laminated form. When the surfaces of the arm 9 and the part 12 fixed to the swingable pivot bearing unit that are joined to the hinges 10 and 11 are made of a stainless steel plate, hinges 10 and 11 made of a stainless steel plate may be joined to them by welding, as in the foregoing embodiment.

When the surfaces of the arm 9 and the part 12 fixed to the swingable pivot bearing unit that are joined to the hinges 10 and 11 are made of an aluminum plate, an engineering plastic, silicon, or a silicon compound, hinges 10 and 11 made of a stainless steel plate may be joined to them in an adhesive manner.

When the hinges 10 and 11 are formed from a flexible printed circuit made of copper sandwiched by polyimide, they can be joined to the arm 9 and the part 12 fixed to the swingable pivot bearing unit in an adhesive manner regardless of the material thereof.

Embodiment 2

Figure 7:
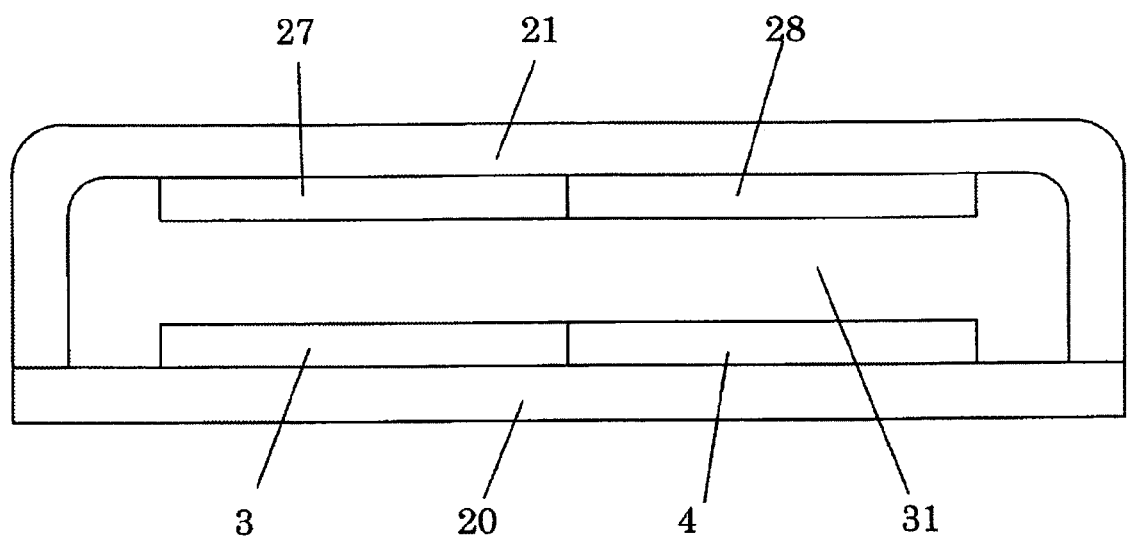
FIG. 7 shows a cross section of a voice coil motor magnet according to Embodiment 2 of the invention.

FIG. 7 shows a cross section of a voice coil motor magnet 24 according to Embodiment 2 of the invention.

The voice coil motor magnet 24 includes, in addition to the pair of permanent magnets as according to Embodiment 1, a second pair of permanent magnets 27 and 28. The permanent magnets 27 and 28 are each joined to the upper yoke 21 such that they are opposite the permanent magnets 3 and 4, respectively. Their directions of magnetization are the same as those of the permanent magnets 3 and 4, respectively. Namely, as described above, when the polarity of the permanent magnet 3 toward a gap 31 is S, the polarity of the permanent magnet 27 toward the gap 31 is N, such that the surface of the permanent magnet 27 joined to the upper yoke 21 is S-poled and the surface of the permanent magnet 28 joined to the upper yoke 21 is N-poled, with the surface of the permanent magnet 28 toward the gap 31 being S-poled.

In Embodiment 2, as compared with Embodiment 1, the direction of magnetic flux within the voice coil motor magnet 24 is more perpendicular to the yoke 20. The voice coil motor magnet 24 can be combined with the actuator moving part 1 of Embodiment 1 so as to provide an actuator for optical disc drives. Nevertheless, when a current is caused to flow through the focusing coils 5 and 6 and the tracking coil 7 in their predetermined directions, the focusing coils 5 and 6 can more accurately generate a force in the focusing direction and the tracking coil 7 can more accurately generate a force in the tracking direction than in Embodiment 1. As a result, the force with which the actuator moving part 1 is twisted by the focusing coils 5 and 6 and the tracking coil 7 becomes smaller, thereby making it possible to provide a small-sized optical disc drive actuator and optical disc drive having good vibration characteristics.

Embodiment 3

Figure 8:
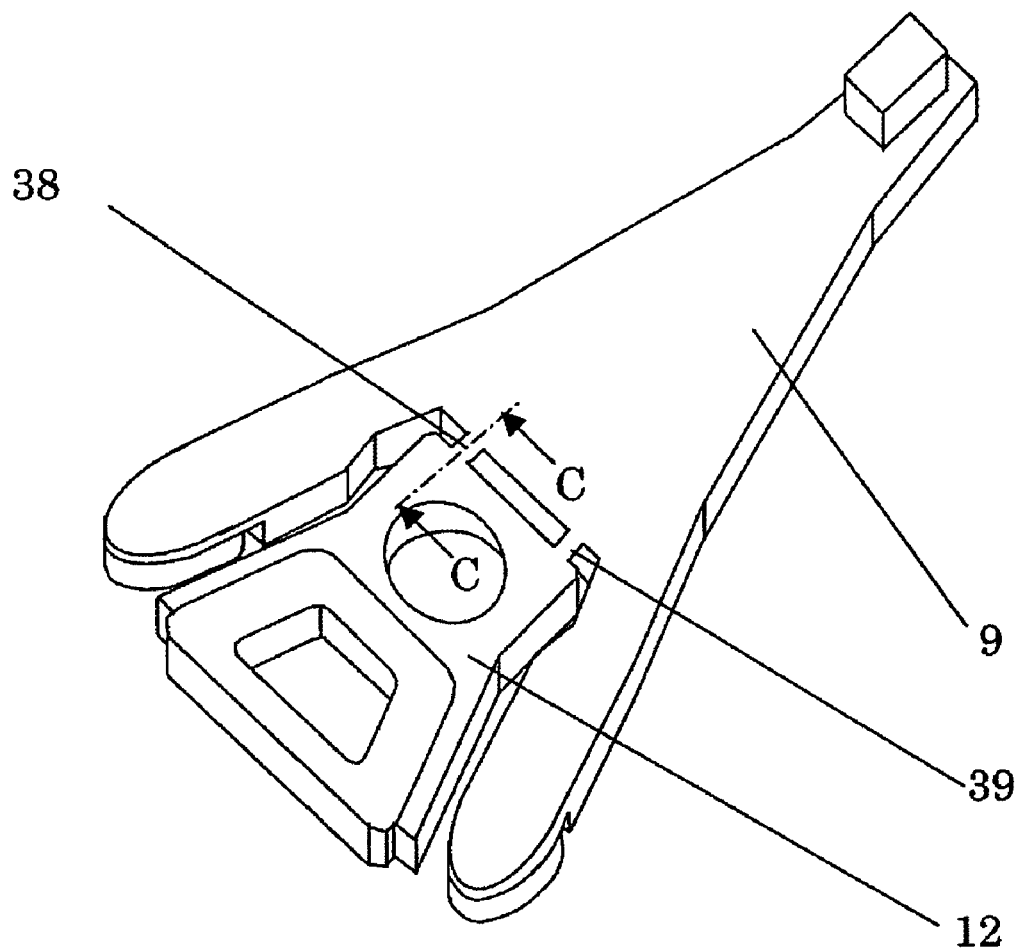
FIG. 8 shows a perspective view of an actuator moving part according to Embodiment 3 of the invention.
Figure 9:
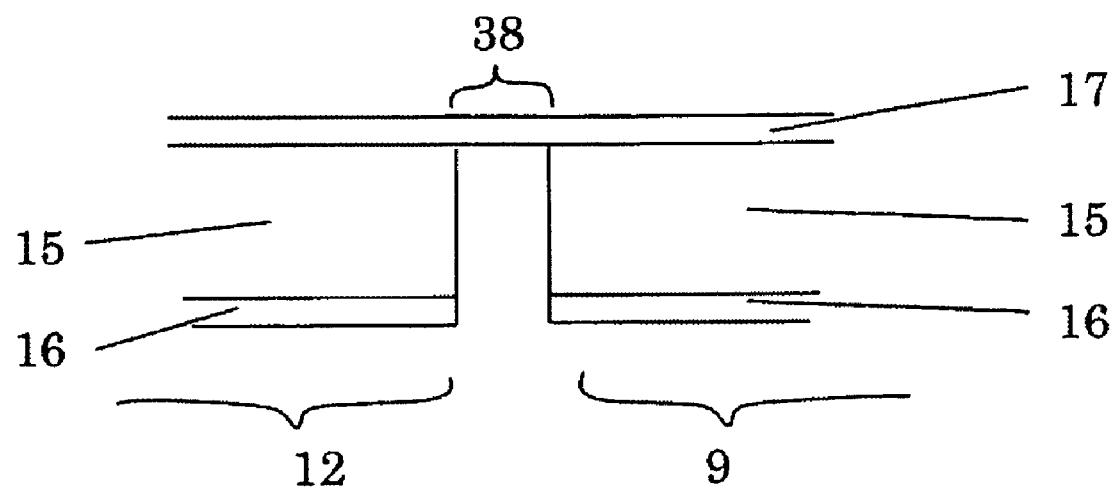
FIG. 9 shows a C-C cross section of Embodiment 3 shown in FIG. 8.

FIG. 8 shows a perspective view of an actuator moving part 32 according to Embodiment 3 of the invention. FIG. 9 shows a C-C cross section of the actuator moving part 32 shown in FIG. 8.

The arm 9 and the part 12 fixed to a swingable pivot bearing unit of this actuator moving part 32 are each made of a so-called clad material having a laminated structure consisting of an aluminum plate 15 sandwiched by stainless steel plates 16 and 17. The hinges 38 and 39 are made by forming a stainless steel plate 17 into a desired shape.

The hinges 38 and 39 are formed by first processing the stainless steel plate 17 into a desired shape by etching, press working, or electrical discharge machining, and then masking the stainless steel plate 17 and removing desired portions of a stainless steel plate 16 and an aluminum plate 15 on the opposite side by etching or electrical discharge machining.

In the present embodiment, there is no need to join the hinges to the arm or the portion that is fixed to a swingable pivot bearing unit by welding or gluing, as in Embodiments 1 and 2. Thus, an actuator moving part 32 can be provided in which the number of components is reduced, the accuracy of assembly or the relative positional relationship among the arm 9, the part 12 fixed to a swingable pivot bearing unit, and the hinges 38 and 39 is improved, and variations in terms of vibration or stiffness are small.

For example, when the nominal gap between the arm 9 and the part 12 fixed to a swingable pivot bearing unit at the hinges 38 and 39 is 1 mm, a size error of 0.04 mm due to welding and that of 0.02 mm due to etching can be expected. In the cases of Embodiments 1 and 2, the hinges 38 and 39 have bending stiffness variations of approximately 12% due to size error by welding. In the present embodiment, the bending stiffness variations in the hinges 38 and 39 due to size error by welding are approximately 6%. Thus, the stiffness variations can be reduced in half in the present embodiment.

By substituting this actuator moving part 32 for the actuator moving part 1 of Embodiment 1 or 2, a small-sized optical disc drive having reduced vibration and little characteristics variations can be provided.

In another method for manufacturing the hinges 38 and 39, a stainless steel plate 17 formed in the planar shape of the hinges 38 and 39 may be laminated and joined with an aluminum plate 15 and a stainless steel plate 16. In the present embodiment, the arm 9 and the part 12 fixed to a swingable pivot bearing unit are each made of a clad material comprised of an aluminum plate 15 laminated with stainless steel plates 16 and 17. However, instead of such clad material, they may be formed of a laminate comprised of silicon oxide sandwiched by silicon, or a so-called SOI (Silicon On Insulator). In this case, preferably the thickness of each of the two silicon layers by which silicon oxide is sandwiched is made different from each other, and a hinge is formed on the silicon layer with a smaller thickness.

Alternatively, instead of using the clad material or the SOI, the arm 9 and the part 12 fixed to the swingable pivot bearing unit may be formed of a single-layer plate of an etchable material. In this case, such plate is etched on the side opposite from the hinges 38 and 39 until a desired thickness for the hinges 38 and 39 remains.

Embodiment 4

Figure 10:
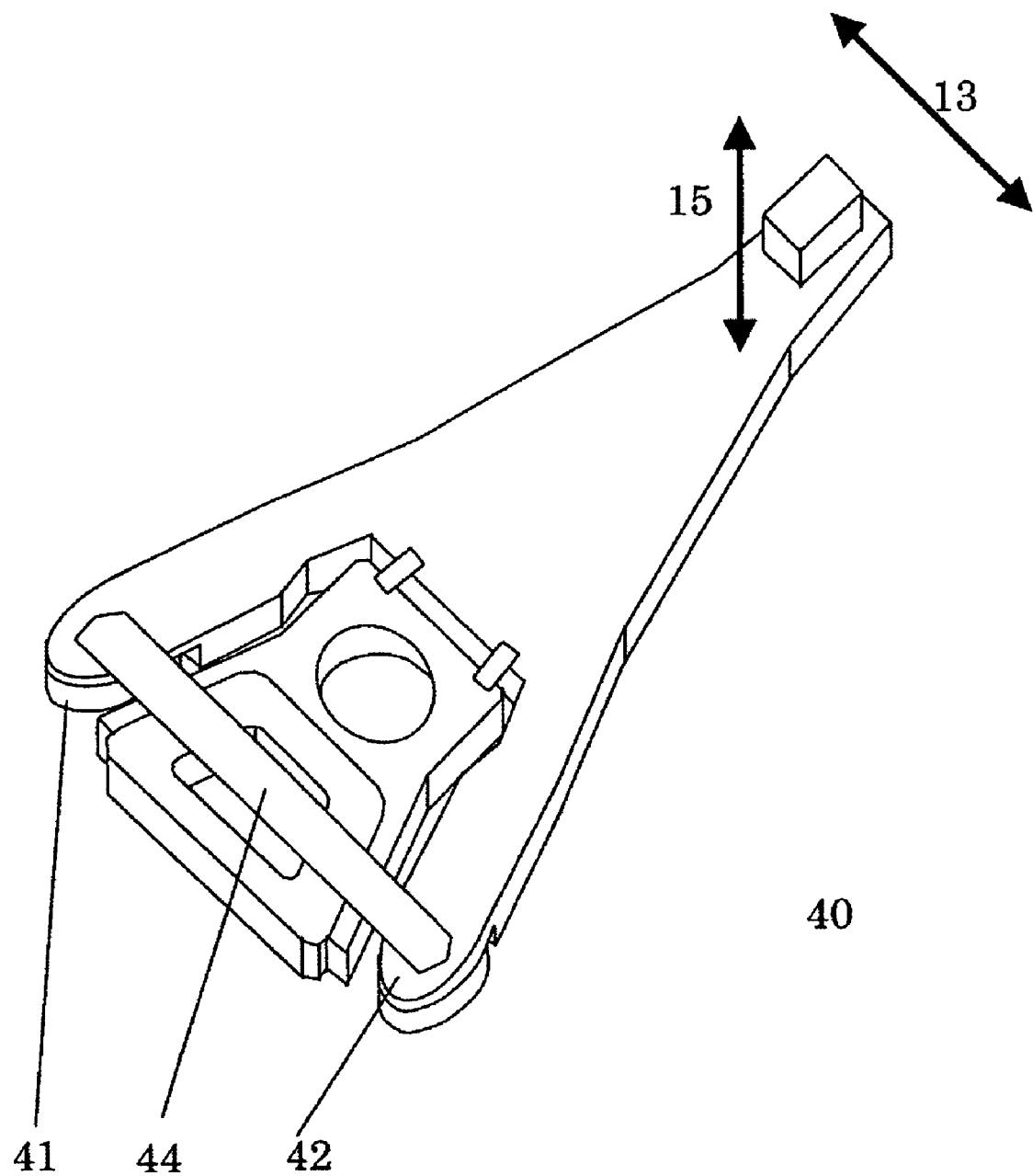
FIG. 10 shows a perspective view of an actuator moving part according to Embodiment 4 of the invention.

FIG. 10 shows a perspective view of an actuator moving part 40 according to Embodiment 4 of the invention. A beam 44 is extended between two focusing-coil carrying portions 41 and 42 in the same direction as the tracking direction 13. A slight gap is provided between the beam 44 and the tracking coil 7 so that they do not collide with each other even when the focusing coils 5 and 6 are moved in the focusing direction 14. The beam 44 helps to increase the natural frequency in the mode in which the focusing-coil carrying portions 41 and 42 vibrate in opposite phases. Thus, an actuator moving part 40 can be provided that has high stiffness, i.e., reduced vibration.

Furthermore, by substituting this actuator moving part 40 for the actuator moving part 1 of Embodiment 1 or 2, or for the actuator moving part 32 of Embodiment 3, a small-sized and reduced-vibration optical disc drive can be provided.

While in the actuator moving part 40 shown in FIG. 10 only one beam is extended between the two focusing coils carrying portions 41 and 42 in the same direction as the tracking direction 13, more than one such beam may be provided.

What is claimed is:

1. An optical disc drive comprising a swing arm actuator having a tracking function and a focusing function, further comprising:
    two focusing coils;
    a tracking coil disposed between the two focusing coils; and
    a first pair of permanent magnets horizontally disposed opposite the tracking coil and the two focusing coils,
    wherein the pair of permanent magnets is disposed such that the directions of magnetization of the magnets are opposite from each other, wherein the tracking coil is disposed over the pair of permanent magnets in such a manner as to straddle the boundary thereof, and wherein one of the two focusing coils is disposed over one of the pair of permanent magnets and the other of the two focusing coils is disposed over the other of the pair of permanent magnets.

2. The optical disc drive according to claim 1, further comprising a second pair of permanent magnets disposed opposite the first pair of permanent magnets, wherein the two focusing coils and the tracking coil are disposed between the first pair of permanent magnets and the second pair of permanent magnets.

3. The optical disc drive according to claim 1, further comprising one or more hinges made of plates or leaf springs with which an arm that carries the two focusing coils is connected to a portion that carries the tracking coil and that is fixed to a swingable pivot bearing unit, wherein the hinges are disposed between the center of the swinging movement of the part fixed to the swingable pivot bearing unit and an optical pickup.

4. The optical disc drive according to claim 3, wherein the arm and the part fixed to a swingable pivot bearing unit are each made of a clad material comprised of a laminate of different types of material, wherein the hinges are made of a member separate from the laminated clad material, and wherein the hinges are joined to a surface of the arm.

5. The optical disc drive according to claim 4, wherein the clad material is made of an aluminum plate or aluminum plate-based alloy and a stainless steel plate, and wherein the hinges and the layer of the clad material to which the hinges are joined are made of a layer of a stainless steel plate.

6. The optical disc drive according to claim 4, wherein the clad material is made of an aluminum plate or aluminum plate-based alloy and a stainless steel plate, and wherein the hinges are made by drawing the stainless steel plate of which the clad material is made.

7. The optical disc drive according to claim 3, comprising a beam that connects two focusing-coil carrying portions of the arm.

* * * * *